(12) United States Patent
Egan et al.

(10) Patent No.: US 8,380,703 B2
(45) Date of Patent: Feb. 19, 2013

(54) FEEDBACK LOOP BETWEEN A QUERY OPTIMIZER AND A CACHE MANAGER

(75) Inventors: Randy L. Egan, Rochester, MN (US);
Rafal P. Konik, Oronoco, MN (US);
Roger A. Mittelstadt, Byron, MN (US);
Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/843,418

(22) Filed: Jul. 26, 2010

(65) Prior Publication Data
US 2012/0023092 A1 Jan. 26, 2012

(51) Int. Cl.
*G06F 7/00* (2006.01)
*G06F 17/30* (2006.01)

(52) U.S. Cl. .................. 707/716; 707/718; 707/719

(58) Field of Classification Search .................. None
See application file for complete search history.

(56) References Cited

U.S. PATENT DOCUMENTS

| 7,698,513 | B2* | 4/2010 | Sechrest et al. ............... 711/158 |
| 2003/0005457 | A1* | 1/2003 | Faibish et al. ................... 725/94 |
| 2009/0119249 | A1* | 5/2009 | Day et al. .......................... 707/2 |
| 2009/0210445 | A1* | 8/2009 | Draese et al. ............. 707/103 R |
| 2011/0035369 | A1* | 2/2011 | Halasipuram et al. ........ 707/720 |

* cited by examiner

*Primary Examiner* — Hosain Alam
*Assistant Examiner* — Azam Cheema
(74) *Attorney, Agent, or Firm* — Patterson & Sheridan LLP

(57) ABSTRACT

Systems, methods and computer program products are disclosed for managing a database cache. In one embodiment, access to a data object stored in a database is monitored. A memory residency priority for the data object is determined, based on the access patterns. Further, an access plan is determined for a query, based on the memory residency priority. Access to the data object is also monitored when the access plan is executed, thereby providing a feedback loop between determining memory residency priorities and determining query access plans.

24 Claims, 4 Drawing Sheets

US 8,380,703 B2

FEEDBACK LOOP BETWEEN A QUERY OPTIMIZER AND A CACHE MANAGER

BACKGROUND

1. Field

Embodiments of the invention relate generally to computer databases and, more particularly, to managing database caches.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

SUMMARY

Embodiments of the invention provide a computer-implemented method, computer program product, and system for performing an operation that may generally include monitoring access to at least a data object stored in a database. The operation may also include determining a memory residency priority for keeping the data object pinned in memory, based on the monitored access to the data object. The operation may also include determining an access plan for a query accessing the data object, based on the memory residency priority for keeping the data object pinned in memory.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
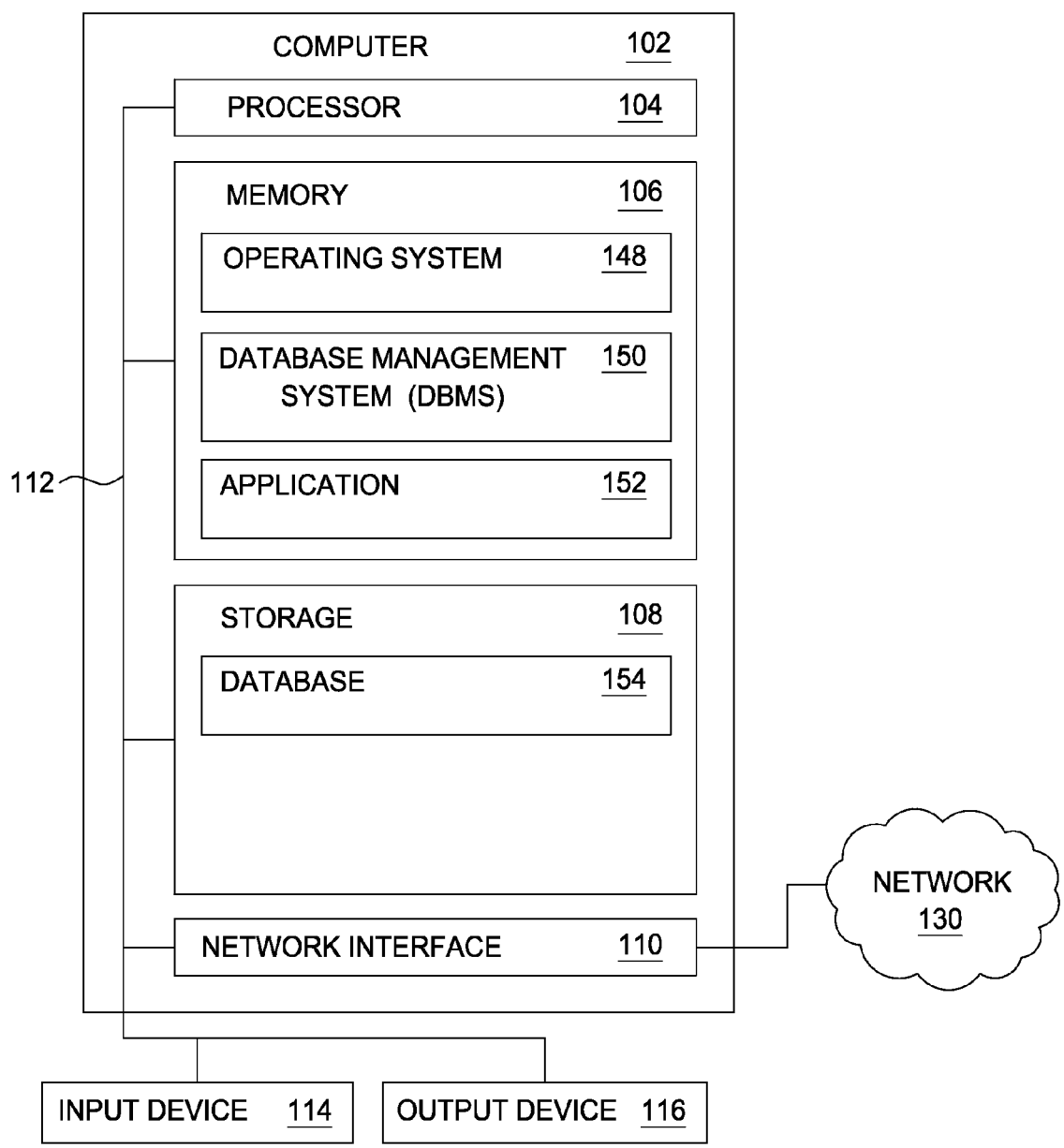
FIG. 1 is a block diagram illustrating a system for managing a database, according to one embodiment of the invention.

Embodiments of the invention provide techniques for managing a database cache. In one embodiment, a database management system (DBMS) executing on a computer system manages data objects in a database cache of the computer system. The database cache may also be referred to as a database buffer pool. In one embodiment, the database cache refers to an area of virtual storage (e.g., in main memory) that temporarily stores pages of table spaces or indexes. When an application requests for a row of a table, the DBMS places a database page containing that row in the database cache. If the requested data already resides in the database cache, the DBMS returns the data to the application without incurring the costs of retrieving the data from disk. Avoiding the need to retrieve data from disk may result in improved performance of the DBMS and/or of the requesting application.

Further, the DBMS tracks access patterns associated with data objects. The DBMS determines a memory residency priority for keeping each data object in the database cache. In some embodiments, keeping a data object in the database cache causes the data object to remain pinned in memory. Based on the memory residency priority for a given data object, the DBMS determines an access plan for a query. Consequently, the DBMS may provide an access plan that is more suitable for the query than when the memory residency priority is not taken into account. Accordingly, performance of the DBMS and/or requesting applications may be improved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for managing a database, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 146. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes the operating system 148, a DBMS 150, and an application 152. The DBMS 150 may manage a database 154, shown in storage 108. In one embodiment, the DBMS 150 is the DB2 product offered by the IBM Corporation for the MVS, AIX, or Linux or Microsoft Windows operating systems. Generally, those skilled in the art will recognize that the present invention has application to any DBMS software that uses SQL, and may similarly be applied to database software using non-SQL queries. More generally, however, it should be understood that the data to be accessed need not be part of a DBMS at all. The application 152 (and more generally, any requesting entity, including the operating system 148) is configured to issue queries against the database 154. Although only one database is shown for simplicity, the DBMS 150 may manage multiple databases. Further, the databases may be distributed relative to one another, e.g., over the network 130. And although the application 152 and the DBMS 150 are shown to be executing on the computer 102, the application 152 may also execute on a different computer that communicates with the computer 102 via the network 130.

In one embodiment, the database 154 is representative of any collection of data, regardless of the particular physical representation of the data. A physical representation of data defines an organizational schema of the data. By way of illustration, the database 154 may be organized according to a relational schema (accessible by SQL queries) or according to an XML schema (accessible by XML queries). However, embodiments of the invention are not limited to a particular schema and contemplates extension to schemas presently unknown. As used herein, the term "schema" generically refers to a particular arrangement of data.

In one embodiment, the database 154 stores database tables that include data pages. Each data page is configured to store data rows that, in turn, store information. The database table may also include a database index for logically ordering the data rows. The database index includes index pages. Each index page is configured to store index entries, where each data row is referenced by a corresponding index entry. The data pages and the index pages are arranged to be stored on and retrieved from a storage medium such as the storage 108.

In one embodiment, the application 152 issues a request to the DBMS 150. The request includes a query statement (e.g., a select, insert, or update). Depending on the embodiment, the request issued by the application 152 may be predefined (i.e., hard coded as part of the application 152) or may be generated in response to input (e.g., user input).

In one embodiment, to service the request from the application 152, the DBMS 150 performs a number of database operations. For example, the DBMS 150 retrieves index entries and data rows from storage (e.g., disk or tape) into a database cache (e.g., in main memory). The speed of accessing the storage 108 may be much slower than other operations involved in servicing a request, such as operations involving the database cache. Consequently, performance of the DBMS 150 in servicing the request may be, to a large extent, determined by a frequency with which the DBMS 150 accesses the storage 108.

In one embodiment, the DBMS 150 manages which data objects reside in the database cache to improve performance of the DBMS and requesting applications. To this end, the DBMS tracks access patterns associated with data objects. Based on the access patterns, the DBMS determines a memory residency priority for keeping each data object in the database cache. Based on the memory residency priority for a given data object, the DBMS determines an access plan for a received query. Taking the memory residency priority into account in determining the access plan may yield more efficient access plans in some cases. Accordingly, the performance of the DBMS 150 in servicing requests may be improved.

Figure 2:
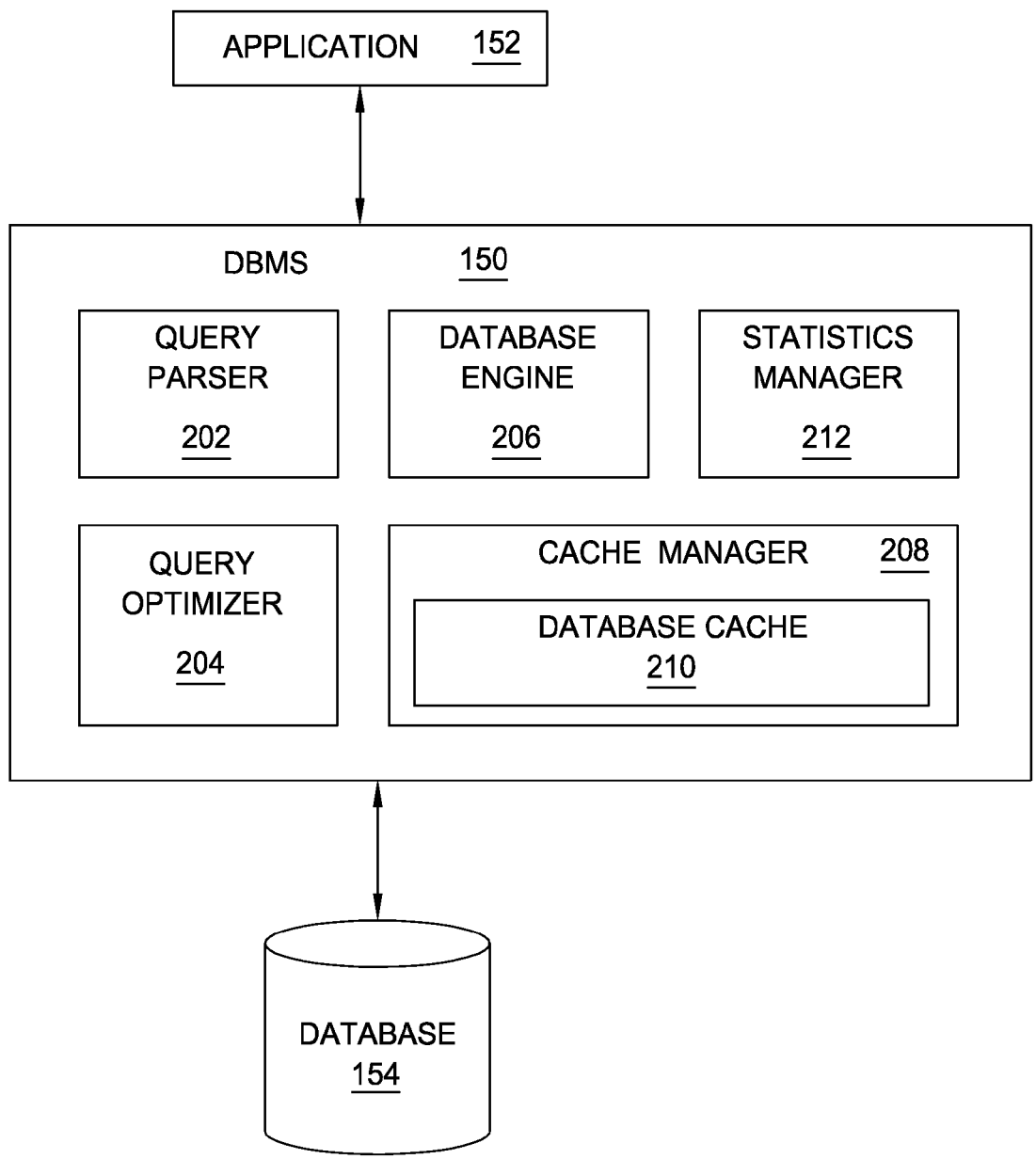
FIG. 2 is a block diagram illustrating a database management system (DBMS), according to one embodiment of the invention.

FIG. 2 is a block diagram illustrating the DBMS 150 of FIG. 1, according to one embodiment of the invention. As shown, the DBMS 150 includes a query parser 202, a query optimizer 204, a database engine 206, a cache manager 208, and a statistics manager 212. The cache manager 208 includes a database cache 210. The DBMS 150 may interact with the application 152 or a user by receiving query statements from the application 152 or the user. The query statements may result in retrieval of data stored in the database 154.

In one embodiment, upon receiving a query statement, the query parser 202 parses the received query statement. Parsing the query statement may involve checking for correct syntax according to a query language specification associated with the DBMS 150. For example, the query parser 202 may create input tokens from a sequence of characters in the received query statement and generate data structure (such as a parse tree, an abstract syntax tree, or the like) based on input tokens. Depending on the embodiment, a separate lexical analyzer may be used to create the input tokens from a sequence of characters in the received query statement.

In one embodiment, prior to the query statement being executed, the query optimizer 204 optimizes the query statement. Optimizing the query statement may involve determining how tables addressed by the query statement are accessed. As a result of optimizing the query statement, the query optimizer 204 may determine an access plan from the data structure created by the query parser 202, where the access plan specifies how tables addressed by the query statement are accessed. In other words, the output of the query optimization process is an access plan. The access plan may include, in a proprietary form specific to the query optimizer/DBMS, low-level information specifying precisely what steps the database engine 206 should take (and in what order) to execute the query statement. The access plan may also include an estimate by the query optimizer 204 of how long it may take for the database engine 206 to execute the query statement in accordance with the access plan.

In one embodiment, the query optimizer 204 may determine the access plan in the following manner. Depending on the embodiment, the query optimizer 204 may be a rule-based query optimizer or a cost-based query optimizer. A rule-based query optimizer generates an access plan based on predefined rules. The rules may be defined by a database administrator to specify how an access plan is generated from a query statement. These rules, for example, may relate to creating or using indices or may relate to how join statements are performed (e.g., join orders, join algorithms, etc.). At least in some cases, the more skillful the user is in specifying the rules, the better the resulting access plan may perform. Further, the rules may take into account memory residency priorities determined by the cache manager 208, which is further described below in conjunction with FIG. 3. Advantageously, the rule-based query optimizer may determine a more suitable access plan for the query statement.

In one embodiment, a cost-based query optimizer includes information on multiple alternative ways that a query statement may be converted into an access plan. The cost-based query optimizer determines an estimated cost for executing each alternative access plan. The cost-based query optimizer then determines the access plan having the lowest estimated cost. In determining an estimated cost for executing an access plan, the cost-based query optimizer may take into account memory residency priorities determined by the cache manager 208, which is further described below in conjunction with FIG. 3.

In some cases, the cost-based query optimizer may evaluate a large number of access plans for a query statement. The large number of access plans may stem from the query statement accessing numerous tables that include many data columns of various types, numerous methods of accessing actual data records from each table referenced (e.g., using an index, a hash table, etc.), etc. However, evaluating the large number of access plans for the query statement may consume a large amount of system resources and may hamper throughput of the DMBS 150. Accordingly, the cost-based query optimizer may take memory residency priorities into account in evaluating and selecting an access plan. Advantageously, the cost-based query optimizer may more efficiently determine a suitable access plan for the query statement.

In one embodiment, the database engine 206 executes the query statement using the access plan generated by the query optimizer 204. The database engine 206 retrieves and processes the data for the query statement. The access plan includes a list of instructions to be executed by the database engine 206. The list of instructions specify access methods to be used, data objects to be created, and system resources to be acquired. The database engine 206 may also communicate with the cache manager 208 to specify which data objects from the database 152 are to remain in the database cache 210.

In one embodiment, the cache manager 208 manages the database cache 210, which may be arranged as a buffer pool, and stores/retrieves data and index pages from the database 154. Data pages may correspond to physical blocks of the storage 108 that contains the database 154. Depending on the embodiment, the DBMS 150 may also include a media manager (not shown) that communicates with the storage 108 via I/O operations addressing the physical blocks, and the cache manager 208 may interface with the media manager to store and retrieve data. In some embodiments, the cache manager and/or media manager may use operating system functions to store and retrieve data and to thereby manage the database cache 210. These operating system functions may be part of an application programming interface (API) provided by the operating system.

In one embodiment, the database cache 210 includes a collection of frames. Each frame may store a data page from the database 154, as the data page is brought in from the storage 108 to the memory 106. Each data page stored in the database cache 210 may include a property indicating whether the respective data page is pinned. Depending on the embodiment, the property may be a boolean or an integer value. A pinned data page indicates to the cache manager 208 that the pinned data page in the frame of the database cache 210 should not be replaced with another data page. An unpinned data page indicates to the cache manager 208 that the unpinned data page in the frame of the database cache 210 may be replaced with another data page. The cache manager 208 may also apply an algorithm—such as the least recently used (LRU) algorithm—to determine which data pages in the database cache 210 should be replaced with data pages subsequently retrieved from disk.

In one embodiment, each data page stored in the database cache 210 may also include a property indicating whether the respective data page is dirty—i.e., whether the data page includes changes that should be persisted to the storage 108. A dirty data page indicates to the cache manager 208 that the dirty data page should be flushed to the storage 108. A clean data page indicates to the cache manager 208 that the clean data page need not be flushed to the storage 108.

In one embodiment, to determine which data pages reside in which frames of the database cache 210, the cache manager 208 may create and/or maintain an index, such as a hash table. The hash table may be implemented as an array referencing lists of tuples. Each tuple includes a data page identifier and a corresponding frame identifier (of the frame where the data page identifier is stored in the database cache 210).

In one embodiment, the statistics manager 212 performs statistical analysis on data objects stored in the database 153, to determine structures of the data objects and distributions of data values in the data objects. As further described below in conjunction with FIGS. 3-4, in some embodiments, the DBMS 150 provides a feedback loop that includes at least the query optimizer 204 and the cache manager 208.

Figure 3:
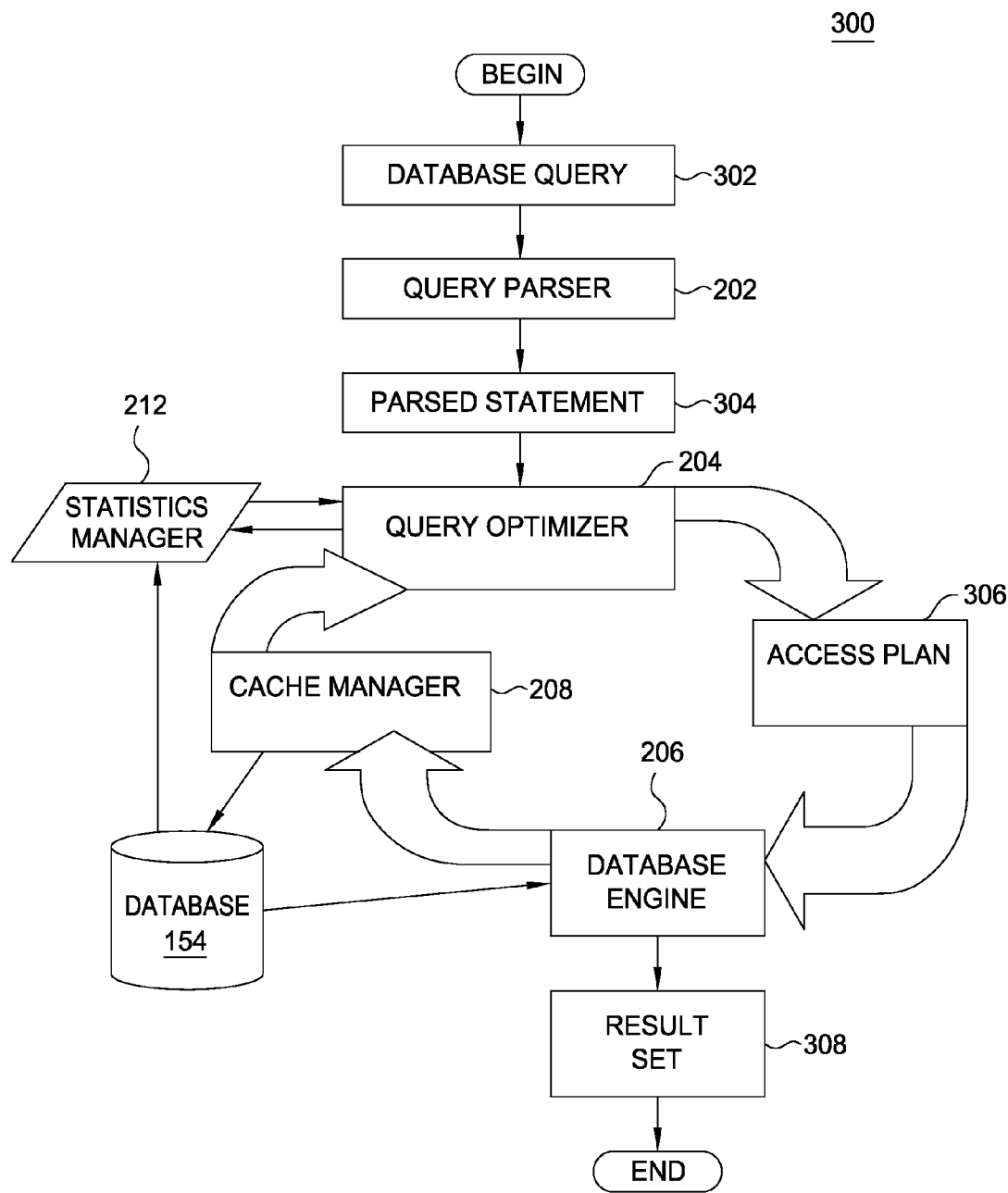
FIG. 3 illustrates a data flow for the DBMS, according to one embodiment of the invention.

FIG. 3 illustrates a data flow 300 for the DBMS 150 of FIG. 1, according to one embodiment of the invention. As described above, the application 152 issues a database query 302 to the DBMS 150. The query parser 202 of the DBMS 150 parses the database query 302 to generate a parsed statement 304. For example, the query parser 202 performs syntactical analysis of the database query 302, based on a query language specification associated with the DBMS 150. The parsed statement 304 serves as an internal representation of the database query 302 and may fully describe relational attributes of the database query 302.

In one embodiment, the query optimizer 204 of the DBMS 150 generates an access plan 306 from the parsed statement 304. For example, the query optimizer 204 compiles the parsed statement using descriptive information maintained by the statistics manager 212 and using memory residency priority information maintained by the cache manager 208. As described above, the access plan includes instructions to be executed by the database engine 206. The query optimizer 204 generates an access plan that access one or more specific data objects residing in the database cache 210. As multiple access plans are generated by the query optimizer 204 in response to multiple database queries 302, the cache manager 208 increases a memory residency priority associated with the one or more specific data objects. That is, the memory residency priority is increased because the multiple access plans each accessing the one or more specific data objects residing in the database cache 210.

The database engine 206 may then execute the access plan 306 to retrieve and process data from the database 154, to generate a result set 308. The database engine 206 may place a request to the cache manager 208, specifying that data objects or portions of the data objects should remain in the database cache 210 (e.g., remain resident in memory). In some embodiments, the access plan 306 may also include instructions to have the cache manager 208 pre-load data objects that are subsequently accessed by the access plan 306.

Once the result set 308 is generated by the database engine 206, the DBMS 150 returns the result set 308 to the application 152, responsive to the database query 302.

In one embodiment, the cache manager 208 manages data objects in the database cache 210. The cache manager 208 schedules I/O operations for moving the data objects from the database 154 to the database cache 210. The cache manager 210 also determines a memory residency priority for a data object, based on usage of the data object by the database engine 206. Further, the cache manager 210 provides a feedback mechanism to the query optimizer 204. Using the feedback mechanism, the query optimizer 204 may tailor subsequent access plans based on predefined criteria. The criteria may include memory resource availability, a likelihood that data objects accessed by the subsequent access plans reside in the database cache 210, and a frequency with which each of the data objects are accessed by previous access plans and/or by the subsequent access plans. Accordingly, the query optimizer 204 may generate access plans that specify for data objects to be pre-loaded to be used during execution of the access plan.

As described above, the cache manager 210 determines the memory residency priority for the data object, based on usage of the data object by the database engine 206. In one embodiment, the memory residency priority is determined based on criteria such as on a frequency of a data object being accessed, a given period of time of day (and/or day of week, month of year, etc.) that the data object is accessed, and/or correlations between data objects that are accessed by the same access plan. The cache manager 208 may then enforce the memory residency priority to pre-load high-priority data objects into the database cache 210, prevent higher-priority data objects from being replaced in the database cache 210, etc.

As described above, in one embodiment, the statistics manager 208 performs statistical analysis on data objects stored in the database 153, to determine structures of the data objects and distributions of data values in the data objects. The statistics manager 208 may work in conjunction with the query optimizer 204 and/or the database 154 to maintain descriptive information regarding the data objects stored in the database 154. For example, the statistics manager 208 may monitor a frequency with which each data object is referenced in an access plan generated by the query optimizer 204. The statistics manager may also provide usage statistics of the data objects to the cache manager 208. The cache manger 208 then calculates and/or adjusts memory residency priorities for data objects, based on the usage statistics. The memory residency priority may include a range of different priority values. For example, the range may include a highest priority value that specifies to pin a data object in the database cache 210, to a lowest priority value that permits another data object to easily replace the data object in the database cache 210.

In one embodiment, the cache manager 210 provides the memory residency priority to the query optimizer 204 for use in determining an access plan for the database query 302. Depending on the embodiment, the query optimizer 204 generates multiple access plans and estimates a cost of executing each access plan. The query optimizer 204 may then select an access plan based on the estimated cost. Illustratively, if data objects accessed by a given access plan have a high memory residency priority, the query optimizer 204 calculates a lower access cost for random accesses of the data object. The extent to which the access cost is lowered may be scaled according to the magnitude of the memory residency priority on the range of different priority values. The extent to which the access cost is lowered may also be scaled according to access characteristics of the memory 106 and the storage 108 of the computer 102 (e.g., ratio of access times). Accordingly, the query optimizer 204 may use the memory residency priority to determine a suitable access plan for the database query 302.

In one embodiment, by allowing the optimizer 204 to provide feedback to the cache manager 208, the cache manager 208 weighs the usage data against system resource constraints to perform predefined actions. The actions may include maintaining, in the database cache 210, data objects most likely to accessed and/or pre-loading data objects before the database engine 206 requests the data objects. Advantageously, the data objects that are best exploited in the database cache 210 are maintained in the database cache 210, and the query optimizer 204 determines access plans that better exploit the data objects. As such, the DBMS 150 provides a feedback loop that includes at least the query optimizer 204 and the database cache 210. The feedback loop associates usage statistics of data objects and cache statuses of the data objects and provides the associated information to at least the query optimizer 204 and the database cache 210. Consequently, performance of the DBMS 150 and/or the application 152 may be improved.

Figure 4:
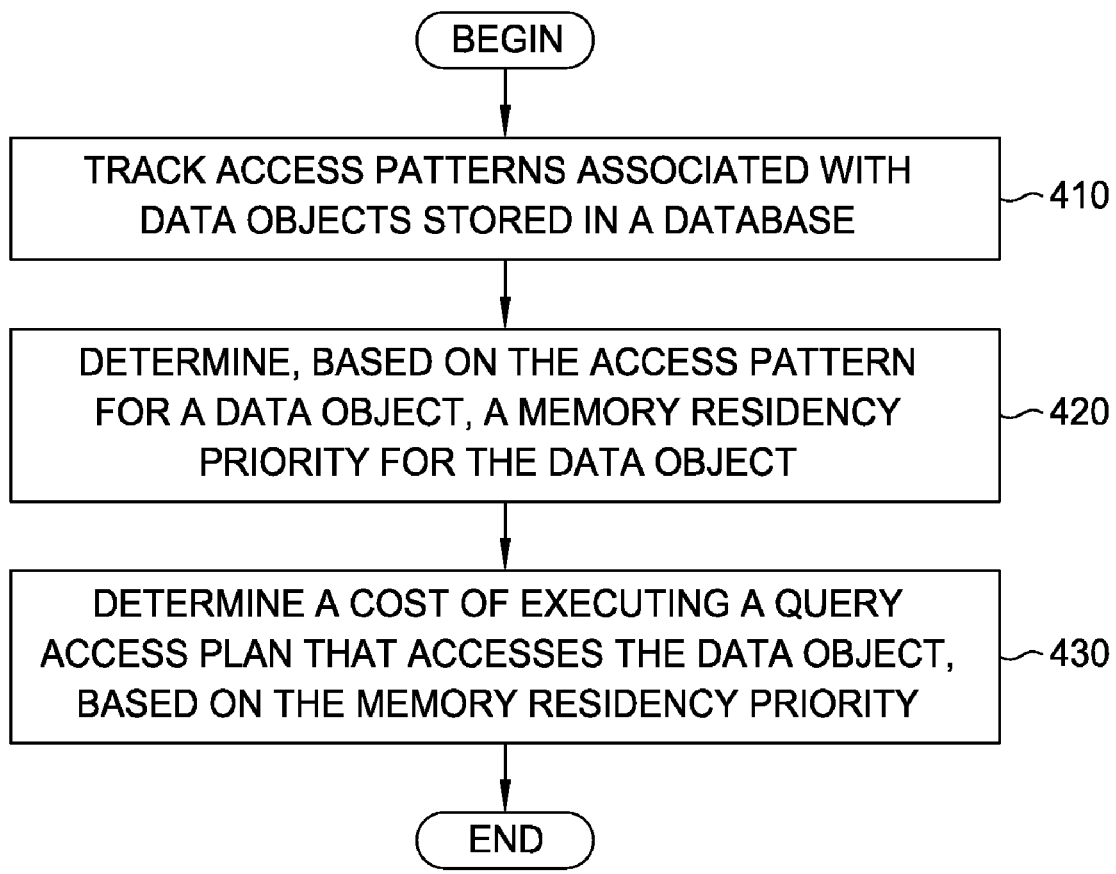
FIG. 4 is a flowchart depicting a method for managing a database cache, according to one embodiment of the invention.

FIG. 4 is a flowchart depicting a method 400 for managing a database cache, according to one embodiment of the invention. As shown, the method 400 begins at step 410, where the DBMS 150 tracks access patterns associated with data objects stored in a database. For example, this step may be performed by the statistics manager 212 of the DBMS 150. At step 420, the DBMS 150 determines, based on the access pattern for a data object, a memory residency priority for the data object. For example, this step may be performed by the cache manager 208 of the DBMS 150. At step 430, the DBMS 150 retrieves the current memory residency priority of the data object and determines a query access plan for a received query. For example, the query optimizer 204 may generate multiple access plans and determine a cost of executing each access plan, based on the current memory residency priority.

In one embodiment, when the access plan is subsequently executed by the DBMS 150 (e.g., by the database engine 206), the statistics manager 212 tracks access patterns of the access plan accordingly (step 410) and the cache manager 208 updates memory residency priorities of data objects accordingly (step 430). After the step 430, the method 400 terminates. The DBMS 150 may also repeat the method 400 to process additional queries (and corresponding access plans). Because the DBMS 150 tracks access patterns of the access plan in executing the access plan, the DBMS 150 provides a feedback loop between determining memory residency priorities and determining access plans for queries (e.g., between the cache manager 208 and the query optimizer 204).

Advantageously, embodiments of the invention provide techniques for providing a feedback loop that includes at least a query optimizer and a cache manager of a DBMS. In one embodiment, the DBMS manages which data objects reside in the database cache to improve performance of the DBMS and/or the application. Further, the DBMS tracks access patterns associated with data objects and determine a memory residency priority for keeping each data object in the database cache. The DBMS also determines an access plan for a received query, based on the memory residency priority. Accordingly, data objects accessed by the access plan may more often reside in the database cache and not incur a costly retrieval from storage. Consequently, performance of the DBMS and/or requesting applications may be improved.

While the foregoing is directed to embodiments of the present invention, other and further embodiments of the invention may be devised without departing from the basic scope thereof, and the scope thereof is determined by the claims that follow.

What is claimed is:

1. A computer-implemented method to provide a feedback loop between query optimization and cache management, the method comprising:
   monitoring access to at least a data object stored in a database having a database cache stored in memory;
   determining a memory residency priority for keeping the data object pinned in the database cache, based on the monitored access to the data object;
   determining, by operation of one or more computer processors, a respective cost of executing each of a plurality of access plans generated from a query configured to access the data object, wherein each cost is determined based on the memory residency priority for keeping the data object pinned in the database cache, whereby the feedback loop is provided between query optimization, defined by determination of the respective cost of executing each access plan, and cache management defined by determination of the memory residency priority; and
   executing an access plan selected from the plurality of access plans, wherein access patterns associated with executing the access plan are tracked.

2. The computer-implemented method of claim 1, wherein determining the access plan for the query further comprises:
   selecting the access plan for execution, based on the determined cost of executing each of the plurality of query access plans.

3. The computer-implemented method of claim 1, wherein the respective cost of executing each of the plurality of access plans is further determined based on a characteristic of the query.

4. The computer-implemented method of claim 1, wherein the data object stored in the database is accessed by another query.

5. The computer-implemented method of claim 1, wherein the memory residency priority is determined by a cache manager of a database management system (DBMS), and wherein the access plan is determined by a query optimizer of the DBMS.

6. The computer-implemented method of claim 1, further comprising:
   selecting an access plan of the plurality of access plans, based on the determined cost of executing each of the plurality of query access plans, wherein the selected access plan is executed to generate a set of query results, wherein the set of query results is output responsive to the query.

7. The computer-implemented method of claim 6, wherein the respective cost of executing each of the plurality of access plans is further determined based on a characteristic of the query, wherein access patterns associated with executing the selected access plan are tracked, wherein a feedback loop is provided between determining the memory residency priority and determining the respective costs, wherein the data object stored in the database is accessed by a subsequent query;
   wherein the database is managed by a database management system (DBMS), wherein the DBMS includes: (i) a query parser component; (ii) a query optimizer component; (iii) a database engine component; (iv) a cache manager component; and (v) a statistics manager component.

8. The computer-implemented method of claim 7, wherein the database cache is configured to store one or more data objects in memory;
   wherein the query parser component is configured to generate a parsed statement based on the query statement;
   wherein the query optimizer component is configured to generate the plurality of access plans based on the parsed statement,
   wherein the database engine component is configured to execute the selected access plan to generate the set of query results;
   wherein the cache manager component is configured to: (i) manage the database cache of the database based on an application programming interface (API) provided by an underlying operating system, including pre-loading data objects requested by the selected access plan and (ii) determine the memory residency priority for keeping the data object pinned in the database cache, based on a predefined set of memory residency criteria pertaining to usage of the data object by the database engine component across queries;
   wherein the statistics manager component is configured to: (i) monitor access to the data object stored in the database and (ii) track access patterns when the selected access plan is executed.

9. The computer-implemented method of claim 8, wherein the query optimizer component is configured to generate the plurality of access plans by compiling the parsed statement based on descriptive information maintained by the statistics manager component and based further on memory residency priority information maintained by the cache manager component.

10. The computer-implemented method of claim 9, wherein a feedback loop is provided between the query optimizer component and the cache manager component of the DBMS, such that the query optimizer component takes into account the memory residency priority determined by the cache manager component, to determine the respective costs of executing each of the plurality of access plans, and such that selection of the access plan by the query optimizer component affects access patterns handled by the cache manager when the selected access plan is executed and further affects a memory residency priority determined by the cache manager component for each data object accessed during execution of the selected access plan.

11. The computer-implemented method of claim 10, wherein the database cache includes a set of frames, each frame configured to store a data page from the database, wherein each frame is further configured to store: (i) a pinned flag indicating whether the data page stored in the respective frame is pinned and (ii) a dirty flag indicating whether the data page stored in the respective frame is dirty;
   wherein a pinned data page is not to be flushed to storage;
   wherein a clean data page need not be flushed to storage;
   wherein an unpinned data page need not remain in the database cache;
   wherein a dirty data page is to be flushed to storage;
   wherein the cache manager is further configured to maintain an index of frames, wherein the index comprises a hash table, wherein each entry in the hash table includes a data page identifier and an associated frame identifier.

12. The computer-implemented method of claim 11, wherein the query optimizer component is further configured to, based on the feedback loop provided between the query optimizer component and the cache manager component and based further on a predefined set of access plan criteria, alter selection of one or more access plans generated for one or more subsequent queries.

13. The computer-implemented method of claim 12, wherein the predefined set of access plan criteria includes: (i) memory resource availability; (ii) a likelihood that data objects accessed by the subsequent access plans reside in the database cache; and (iii) a frequency with which each of the data objects are accessed by at least one of: (A) one or more previous access plans and (B) one or more of the subsequent access plans;

wherein the predefined set of memory residency criteria includes: (i) a frequency with which the data object is accessed, as monitored by the statistics manager component; (ii) a time during which the data object is accessed; and (iii) correlations between data objects accessed by the same access plan.

14. The computer-implemented method of claim 13, wherein an extent to which at least each cost is lowered is scaled based on: (i) a magnitude of the memory residency priority on a predefined scale of permissible memory residency priority values and (ii) access characteristics of the database cache;

wherein data objects most likely to be subsequently accessed are maintained in the database cache, wherein the data objects are loaded prior to the database engine component requesting the data objects, wherein access plans are generated and selected that better exploit the data objects, and wherein usage statistics of the data objects are associated with cache statuses of the data objects.

15. A computer program product to provide a feedback loop between query optimization and cache management, the computer program product comprising:

a computer-readable storage device having computer-readable program code embodied therewith, the computer-readable program code comprising:

computer-readable program code configured to monitor access to at least a data object stored in a database having a database cache stored in memory;

computer-readable program code configured to determine a memory residency priority for keeping the data object pinned in the database cache, based on the monitored access to the data object;

computer-readable program code configured to determine, by operation of one or more computer processors when executing the computer-readable program code, a respective cost of executing each of a plurality of access plans generated from a query configured to access the data object, wherein each cost is determined based on the memory residency priority for keeping the data object pinned in the database cache, whereby the feedback loop is provided between query optimization, defined by determination of the respective cost of executing each access plan, and cache management defined by determination of the memory residency priority; and executing an access plan selected from the plurality of access plans, wherein access patterns associated with executing the access plan are tracked.

16. The computer program product of claim 15, wherein determining the access plan for the query further comprises:
selecting the access plan for execution, based on the determined cost of executing each of the plurality of query access plans.

17. The computer program product of claim 15, wherein the respective cost of executing each of the plurality of access plans is further determined based on a characteristic of the query.

18. The computer program product of claim 15, wherein the data object stored in the database is accessed by another query.

19. The computer program product of claim 15, wherein the memory residency priority is determined by a cache manager of a database management system (DBMS), and wherein the access plan is determined by a query optimizer of the DBMS.

20. A system to provide a feedback loop between query optimization and cache management, the system comprising:
one or more computer processors; and
a memory containing a program, which when executed by the one or more computer processors is configured to perform an operation comprising:
monitoring access to at least a data object stored in a database having a database cache stored in memory;
determining a memory residency priority for keeping the data object pinned in the database cache, based on the monitored access to the data object;
determining a respective cost of executing each of a plurality of access plans generated from a query configured to access the data object, wherein each cost is determined based on the memory residency priority for keeping the data object pinned in the database cache, whereby the feedback loop is provided between query optimization, defined by determination of the respective cost of executing each access plan, and cache management defined by determination of the memory residency priority; and
executing an access plan selected from the plurality of access plans, wherein access patterns associated with executing the access plan are tracked.

21. The system of claim 20, wherein determining the access plan for the query further comprises:
selecting the access plan for execution, based on the determined cost of executing each of the plurality of query access plans.

22. The system of claim 20, wherein the respective cost of executing each of the plurality of access plans is further determined based on a characteristic of the query.

23. The system of claim 20, wherein the data object stored in the database is accessed by another query.

24. The system of claim 20, wherein the memory residency priority is determined by a cache manager of a database management system (DBMS), and wherein the access plan is determined by a query optimizer of the DBMS.

* * * * *